(12) United States Patent
Warmoth et al.

(10) Patent No.: US 12,314,891 B2
(45) Date of Patent: May 27, 2025

(54) AERIAL VEHICLE DELIVERY OF ITEMS

(71) Applicant: Uber Technologies, Inc., San Francisco, CA (US)

(72) Inventors: Adam Shaw Warmoth, Los Altos, CA (US); Cody Boyd, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 18/452,207

(22) Filed: Aug. 18, 2023

(65) Prior Publication Data

US 2024/0086828 A1    Mar. 14, 2024

Related U.S. Application Data

(63) Continuation of application No. 17/116,666, filed on Dec. 9, 2020, now Pat. No. 11,775,923.

(Continued)

(51) Int. Cl.
*G06Q 10/0834* (2023.01)
*B64D 1/08* (2006.01)
(Continued)

(52) U.S. Cl.
CPC ........... *G06Q 10/0834* (2013.01); *B64D 1/08* (2013.01); *G06Q 10/06315* (2013.01);
(Continued)

(58) Field of Classification Search
None
See application file for complete search history.

(56) References Cited

U.S. PATENT DOCUMENTS 11,775,923 B2    10/2023 Warmoth et al.
2003/0125963 A1    7/2003 Haken
(Continued)

FOREIGN PATENT DOCUMENTS

WO    2018005663    1/2018
WO    2021119160    6/2021

OTHER PUBLICATIONS

"International Application Serial No. PCT US2020 064064, International Search Report mailed Mar. 15, 2021", 4 pgs.
(Continued)

*Primary Examiner* — Cory W Eskridge
(74) *Attorney, Agent, or Firm* — Schwegman Lundberg & Woessner, P.A.

(57) ABSTRACT

A delivery management system may select a set of preparation sites for the user using preparation site location data and a delivery site associated with the user. The set of preparation sites may comprise a virtual preparation site that is associated with a second preparation site. The delivery management system may serve menu data to a user computing device. The menu data may indicate at least a first item associated with the virtual preparation site. The delivery management system may receive, from the user computing device, a first order indicating the first item. The delivery management system may send a second order for the first item to the second preparation site, where the second order indicates delivery to the virtual preparation site. The delivery management system may request a vehicle to deliver the first item to the virtual preparation site.

20 Claims, 11 Drawing Sheets

Related U.S. Application Data

(60) Provisional application No. 62/945,709, filed on Dec. 9, 2019.

(51) Int. Cl.
| | | |
|---|---|---|
| *G06Q 10/0631* | (2023.01) | |
| *G06Q 30/0601* | (2023.01) | |
| *G06Q 50/12* | (2012.01) | |
| *B64U 10/13* | (2023.01) | |
| *B64U 101/64* | (2023.01) | |

(52) U.S. Cl.
CPC ..... *G06Q 30/0633* (2013.01); *G06Q 30/0639* (2013.01); *G06Q 50/12* (2013.01); *B64U 10/13* (2023.01); *B64U 2101/64* (2023.01)

(56) References Cited

U.S. PATENT DOCUMENTS

| | | |
|---|---|---|
| 2006/0010037 A1 | 1/2006 | Angert et al. |
| 2007/0007331 A1 | 1/2007 | Jasper et al. |
| 2017/0011340 A1 | 1/2017 | Gabbai |
| 2019/0108472 A1* | 4/2019 | Sweeney ............. G06Q 10/083 |
| 2020/0167722 A1* | 5/2020 | Goldberg ............. G08G 5/0034 |
| 2021/0174294 A1 | 6/2021 | Warmoth et al. |
| 2021/0406815 A1 | 12/2021 | Mimassi |
| 2022/0198355 A1* | 6/2022 | Menachem ........ G06Q 30/0284 |

OTHER PUBLICATIONS

"International Application Serial No. PCT US2020 064064, Written Opinion mailed Mar. 15, 2021", 7 pgs.

"International Application Serial No. PCT US2020 064064, International Preliminary Report on Patentability mailed Jun. 23, 2022", 9 pgs.

"U.S. Appl. No. 17/116,666, Non Final Office Action mailed Oct. 27, 2022", 8 pgs.

"U.S. Appl. No. 17/116,666, Examiner Interview Summary mailed Feb. 6, 2023", 2 pgs.

"U.S. Appl. No. 17/116,666, Response filed Feb. 27, 2023 to Non Final Office Action mailed Oct. 27, 2022", 12 pgs.

"U.S. Appl. No. 17/116,666, Notice of Allowance mailed May 17, 2023", 8 pgs.

Patchou, M, "Unmanned Aerial Vehicles in Logistics: Efficiency Gains and Communication Performance of Hybrid Combinations of Ground and Aerial Vehicles", 2019 IEEE Vehicular Networking Conference (VNC), (2019), 8 pgs.

U.S. Appl. No. 17/116,666 U.S. Pat. No. 11,775,923, filed Dec. 9, 2020, Aerial Vehicle Delivery of Items.

* cited by examiner

AERIAL VEHICLE DELIVERY OF ITEMS

CLAIM FOR PRIORITY

This application is a continuation of U.S. application Ser. No. 17/116,666, filed Dec. 9, 2020, which claims the benefit of priority of U.S. Application Ser. No. 62/945,709, filed Dec. 9, 2019, each of which is hereby incorporated by reference in their entireties.

FIELD

This document pertains generally, but not by way of limitation, to devices, systems, and methods for delivering items to users using an aerial vehicle, such as unmanned aerial vehicles (UAVs).

BACKGROUND

Delivery of items, such as food or cargo, can be performed utilizing aerial vehicles (AVs), including unmanned aerial vehicles (UAVs). An unmanned aerial vehicle (UAV) (e.g., a drone or larger AV) is an aircraft without a human pilot on board. UAVs are a component of an unmanned aircraft system (UAS) which include a UAV, a ground-based controller, and a system of communications between the UAV and the ground-based controller. The flight of UAVs may operate with various degrees of autonomy: either under remote control by a human operator or autonomously by onboard computers.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DESCRIPTION

Figure 1:
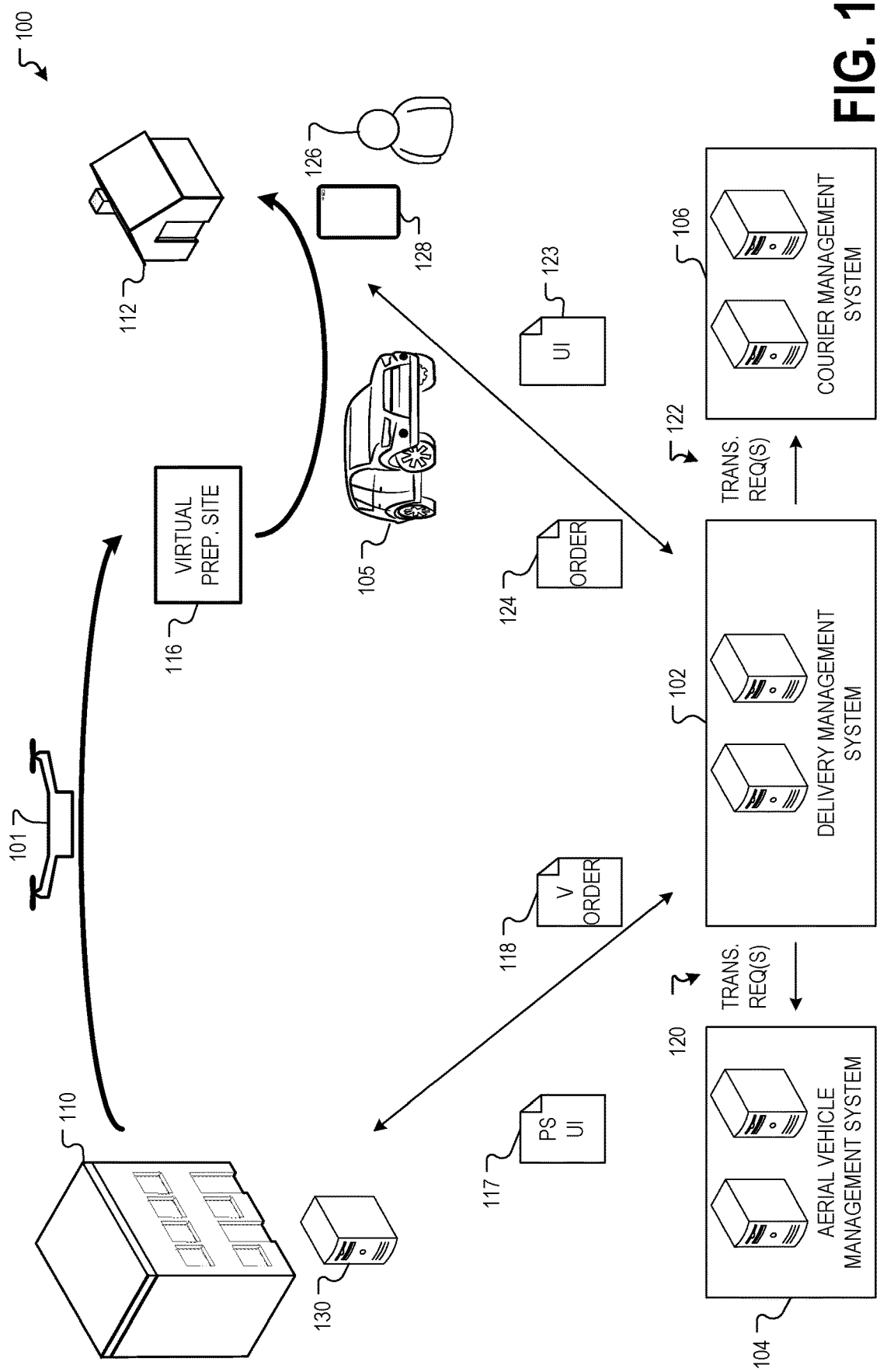
FIG. 1 is a diagram showing one example of an environment for using an AV to deliver items from preparation sites.

Examples described herein are directed to systems and methods for managing UAVs to deliver an item to a user. The item is prepared at an item preparation site and is transported to a delivery site associated with the user. The item may be or include any kind of cargo including, for example, a food item, a package, etc. In examples where the item is a food item, an item preparation site can be a restaurant or other suitable site, as described herein.

A delivery management system manages the delivery of items to users. The user, utilizing a user computing device, places an order to the delivery management system where the order indicates an item or items for delivery. The delivery management system provides the order to an appropriate item delivery site, which prepares the item for delivery. In examples where the item is a food item, the item delivery site may cook or otherwise prepare the food item for eating. The delivery management system also arranges transportation for delivering the item to a delivery site associated with the user, which may be indicated by user account data associated with the user. The transportation can be performed by any suitable vehicle including, for example, a human-driven road-going vehicle, a self-driving road-going vehicle (SDV), or an AV, such as a UAV.

The delivery management system may arrange delivery of items to users based on the users' delivery sites and the location of the respective preparation sites. For example, the delivery management system may arrange the delivery of items only to users' delivery sites that are within a delivery range of a respective preparation site. The delivery range can be determined based on delivery time. Consider an example, in which the preparation sites include a restaurant that prepares food items for delivery. The delivery management system may arrange for delivery of the food items to users having delivery sites that are close enough to the preparation site that a food item can be delivered while it is still warm and ready to eat.

The time that it takes to deliver an item, and therefore the extent of the delivery range for a preparation site, depends on the type of vehicle making the delivery. For example, when a delivery is performed by a road-going vehicle, such as a car or truck, the road-going vehicle is often required to take a route that is longer than a straight-line distance between the preparation site and the delivery site. An AV, on the other hand, is not as strictly limited and may, therefore, may be able to take a more direct route. In some examples, an AV may only need to travel about 1.1 miles for every straight-line mile covered, whereas a road-going vehicle may travel as much or more than 1.4 miles per straight-line mile covered. Also, an AV may be less limited by factors that can slow down a road-going vehicle such as, traffic, speed limits, and the like.

As a result, the delivery range for an AV-delivered item may be larger than the delivery range for items delivered by road-going vehicles. Such increases in delivery range can lead to larger increases in the delivery area for a preparation site. The delivery area for a preparation site is the area that is within the delivery range. For example, an increase in the delivery range for a preparation site results in an increase in the delivery area for that preparation site that goes as the square of the increase in delivery range.

For at least these reasons, it is desirable to utilize AVs to deliver items from preparation sites. The use of AVs to deliver items directly to user delivery sites, however, presents certain challenges. For example, it can be challenging to land an AV or otherwise use an AV to deliver items at wide varieties of delivery sites, such as at user's homes. Also, many preparation sites that could benefit from AV delivery lack an AV port or other suitable facility for receiving and loading AVs.

Various examples described herein address these and/or other challenges by utilizing virtual preparation sites. A virtual preparation site is a geographic location where an AV can land and take-off. Some or all of the items offered at the virtual preparation site are prepared not at the virtual preparation site but, instead, at a second preparation site. An AV is used to bring an ordered item from the second preparation site to the virtual preparation site. The item is delivered from the virtual preparation site to the user's delivery site using any suitable vehicle including, for example, a road-going vehicle, another AV, etc.

The delivery management system is programmed to manage the delivery of items from a virtual preparation site. For example, the delivery management system can receive a request from a user for a set of preparation sites that can provide items for delivery to the user's delivery site. The set of preparation sites can include virtual and non-virtual preparation sites that can provide items for delivery to the delivery site within a threshold time after the items are prepared (e.g., twenty minutes).

The delivery management system accesses preparation site menus for the preparation sites making up the set. For a virtual preparation site, the delivery management system accesses menu data describing one or more corresponding non-virtual preparation sites. Items from the menu of the one or more non-virtual preparation sites that can be delivered to the virtual preparation site and subsequently to the user's delivery site within the threshold time are included in a set of menu items for the virtual preparation site. In this way, the delivery area for the virtual preparation site may extend farther than the delivery area for its one or more associated non-virtual preparation sites.

FIG. 1 is a diagram showing one example of an environment 100 for using an AV to deliver items from preparation sites. The environment 100 includes a delivery management system 102, an example preparation site 110, and an example virtual preparation site 116. In this example, the virtual preparation site 116 is associated with the preparation site 110. The delivery management system 102 may include one or more computing devices, such as one or more servers, that may be located at a common geographic location and/or distributed across multiple geographic locations.

The user computing device 128 can be or include any suitable computing device such as, for example, a tablet computer, a mobile telephone device, a laptop computer, a desktop computer, and so on. In some examples, the user computing device 128 executes an application associated with the delivery management system 102. The user 126 launches the application on the user computing device 128 and utilizes functionality of the application to request items for delivery, as described herein. The delivery management system 102 may serve a user interface (UI) 123 to the user 126 via the user computing device 128. The delivery management system 102 may utilize the UI 123 to provide the user 126 with information about available items and/or preparation sites.

The preparation site 110 may also be associated with a preparation site computing device 130. The preparation site computing device 130 can be or include any suitable computing device such as, for example, a tablet computer, a mobile telephone device, a laptop computer, a desktop computer, and so on. In some examples, the preparation site computing device 130 executes an application associated with the delivery management system 102. An agent of the preparation site, such as an employee, launches the application on the preparation site computing device 130 and utilizes functionality of the application to receive orders from the delivery management system 102, as described herein. For example, the delivery management system 102 may serve a UI 117 to the preparation site 110. The UI 117 may include information about orders placed for or by users at the preparation site 110 including, for example, items ordered and a delivery method for ordered items.

In the example of FIG. 1, the user makes a delivery service request (e.g., via the UI 123). In response, the delivery management system 102 selects a set of preparation sites for the user 126 based on the locations of the preparation sites and the user's delivery site 112. The delivery site 112 is the location where the user 126 would like to have items delivered. The delivery site 112, in some examples, is user's current location. In other examples, the user 126 provides the delivery site 112 (e.g. via the UI 123) along with the request for delivery service. Also, in some examples, the user 126 has an account with the delivery management system 102. The user 126 may specify the delivery site 112, for example, as a default delivery site for the user 126. The selected set of preparation sites is provided to the user, for example, via the UI 123.

The set of preparation sites selected for the user 126 include preparation sites having a delivery range that includes the delivery site 112. In the example of FIG. 1, the delivery site 112 is within the delivery range of the virtual preparation site 116 but is not within the delivery range of the preparation site 110 associated with the virtual preparation site 116. Accordingly, the set of preparation sites includes the virtual preparation site 116. In some examples, the delivery management system 102 considers a distance-based delivery range in addition to or instead of a time-based delivery range.

In some examples, the delivery management system 102 prepares a menu of items that can be ordered for delivery from the virtual preparation site 116. The menu can be prepared from a menu of the associated preparation site 110. For example, the delivery management system 102 reviews the menu of the delivery site 110 and identifies one or more items that are suitable for delivery by AV. For example, items that are suitable for delivery by AV may include items that are of a size that will fit in a cargo area of an AV. Also, in some examples, items that are suitable for delivery in an AV may include items that are either not able to be spilled or sealed to prevent spills. The delivery management system 102 provides the user 126 with the items from the virtual preparation site 116 that are suitable for delivery by AV, for example, via the UI 123. In some examples, the delivery management system 102 receives a selection of the virtual preparation site 116 from the user 126, where the selection prompts the determining of the items suitable for AV delivery and/or the provision of the same to the user 126.

In the example of FIG. 1, the user 126 provides an order 124 to the delivery management system 102. The order 124 indicates an item that is available from the virtual preparation site 116. The order 124, in some examples, is received via the UI 123. The delivery management system 102 determines that the order 124 is directed to a virtual preparation site 116 and identifies the preparation site 110 that is associated with the virtual preparation site 116. The delivery management system 102 generates a virtual order 118 and provides the virtual order 118 to the preparation site 110 (e.g., via the UI 117). In some examples, the order 124 indicates the delivery site 112 where the user 126 would like the items delivered. Also, in some examples, the order 124 is associated with an account of the user 126 at the delivery management system 102. The delivery management system 102 may maintain account data describing the delivery site 112. The order 124 may indicate the account of the user 126, allowing the delivery management system 102 to determine the delivery site 112 by referencing account data for the user 126.

The virtual order 118 indicates the item or items selected by the user 126 in the order 124. The virtual order 118 may also indicate a delivery site, however, the delivery site for the virtual order 118 is the virtual preparation site 116. In some examples, the virtual order 118 includes data indicating the virtual preparation site 116 as its delivery site. Also, in some examples, the virtual order 118 is associated with a virtual user account at the delivery management system 102. The delivery management system 102 may store account data for the virtual user account. The account data identifies the virtual preparation site 116 as a delivery site (e.g., a default delivery site) for the virtual user account. The virtual order 118 may reference the virtual user account. In some examples, the virtual user account may include data that identifies more than one virtual preparation site associated with the user or a delivery site.

The delivery management system 102 also makes a transportation request 120 to an AV management system 104. The AV management system 104 manages at least one AV, such as the AV 101. For example, the AV management system 104 may manage the location, routing, maintenance or battery status, etc. of one of more AVs 101. The transportation request 120 may indicate a transportation service to move the items selected by the user 126 from the preparation site 110 to the virtual preparation site 116. In some examples, the transportation request 120 also indicates a time when the item or items will be ready for transport. The AV management system 104 may select the AV 101 to arrive, in this example at the preparation site 110, to pick up the item or items when the item or items are ready. In this example, the AV 101 is able to pick up the item or items directly at the preparation site 110. For example, the preparation site 110 may have an on-premises drone port or other suitable location and/or mechanism for the AV 101 to land and pick-up items.

The AV 101 delivers the items to the virtual preparation site 116. For example, the virtual preparation site 116 may include a drone port or other suitable location and/or mechanism for the AV 101 to land and drop-off the item or items.

The delivery management system 102 also makes a transportation request 122 to a courier management system 106 to request a road-going courier vehicle 105 to transport the item or items from the virtual preparation site 116 to the delivery site 112, in this example. The courier management system 106 manages at least one road-going courier vehicle 105, which may be human-driven or self-driving. For example, the courier management system 106 may manage the location, routing, maintenance or fuel status, etc. of one of more road-going courier vehicles 105. The transportation request 122 may indicate a transportation service to move the items selected by the user 126 from the preparation site 110 to the virtual preparation site 116. In some examples, the transportation request 122 also indicates a time when the item or items will be ready for transport (e.g., a time when the item or items arrive at the virtual preparation site 116 and are ready for transport to the delivery site 112). The courier management system may select the courier vehicle 105 to arrive at the virtual preparation site 116 to pick up the item or items when the item or items are received from the AV 101 and ready for transport to the delivery site.

The delivery management system 102, in various examples, is configured to determine various estimated times of arrival (ETAs) for the item or items. For example, the delivery management system 102 may determine an ETA for the item or items at the virtual preparation site 116. The preparation site 110 may provide a ready time that indicates when the item or items will be ready for pick-up at the preparation site 110. Further, the AV management system 104 may provide the delivery management system 102 with an estimated time when the AV 101 will arrive at the virtual preparation site 116. One or more of these estimates may be updated. For example, if the preparation of the item or items is delayed, the preparation site 110 may report the delay to the delivery management system 102. Further, if the AV 101 is delayed in picking up the item or items, the AV management system 104 may report the delay to the delivery management system 102.

The delivery management system 102 may also determine an ETA for the items at the delivery site 112. For example, the delivery management system 102 may receive from the courier management system 106 an indication of the ETA of the vehicle 105 at the delivery site 112. The delivery management system 102 may report the ETA for the item or items at the delivery site 112 to the user 126, for example, via the UI 123. In some examples, the delivery management system 102 also report to the user a current location of their item or items as the item or items are transported to the delivery site 112. The current location may indicate the current custodian of the item or items (e.g., the preparation site 110, the AV 101, the virtual preparation site 116 and/or the vehicle 105) or, in some examples, may show the location of the item or items on a map.

Figure 2:
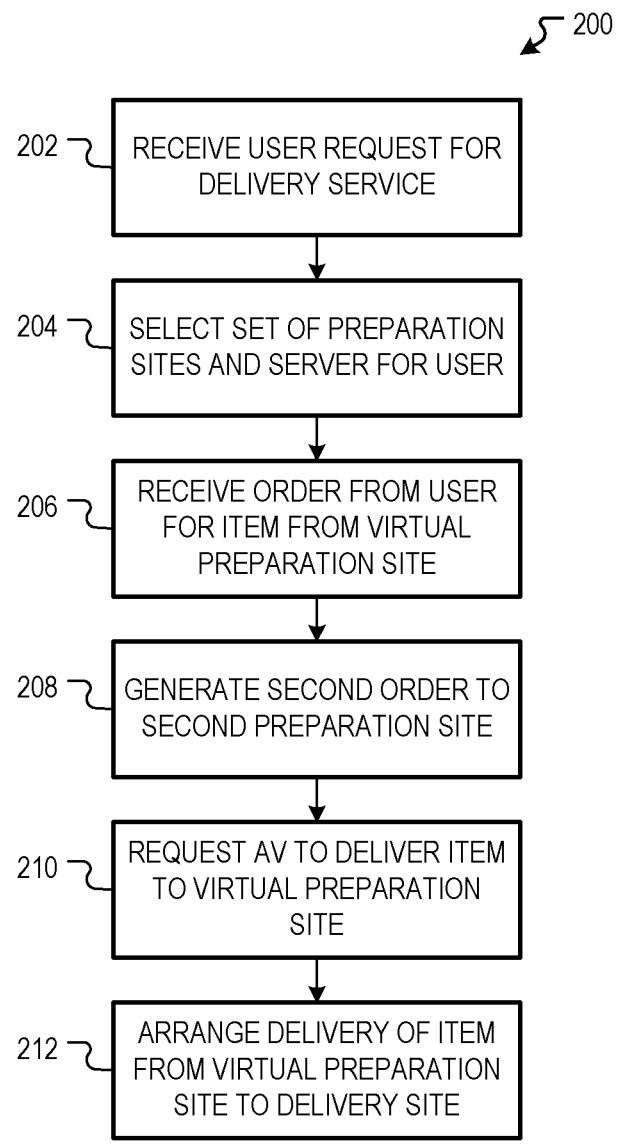
FIG. 2 is a flowchart showing an example of a process flow that may be executed by the delivery management system to arrange delivery of an item to a user.

FIG. 2 is a flowchart showing an example of a process flow 200 that may be executed by the delivery management system 102 to arrange delivery of an item to a user. At operation 202, the delivery management system 102 receives a user request for a delivery service. The user request may be sent, for example, by the user 126 via an application executing at the user computing device 128. The request, in some examples, indicates the user's delivery site 112, which may be the user's home or other place where the user 126 would like to receive the items for delivery.

At operation 204, the delivery management system 102 selects a set of preparation sites. The selected set of preparation sites include preparation sites that are within a delivery range of the user's delivery site 112. The selected set of preparation sites includes one or more virtual preparation sites, including the virtual preparation site 116. The selected set of preparation sites may be provided to the user 126, for example, via the user computing device 128 and UI 123. At operation 206, the delivery management system 102 receives the order 124 from the user. The order 124 indicates one or more items from the virtual preparation site 116 for delivery to the delivery site 116.

At operation 208, the delivery management system 102 generates a second or virtual order 118 that is provided to a second preparation site 110. The second preparation site 110 prepares the one or more items indicated by the user 126 at the order 124. The delivery management system 102, at operation 210, requests an AV to delivery the one or more items from the second preparation site 110 to the virtual preparation site 116. For example, the delivery management system 102 may provide the transportation request 120 to the aerial vehicle management system 104 requesting than an AV, such as AV 101, deliver the one or more items to the virtual preparation site. At operation 212, the delivery management system arranges delivery of the one or more items from the virtual preparation site 116 to the delivery site 112. This can include, for example, sending a transportation request 122 to the courier management system 106 to arrange for the courier vehicle 105 to delivery the one or more items from the virtual preparation site 116 to the delivery location 112.

Figure 3:
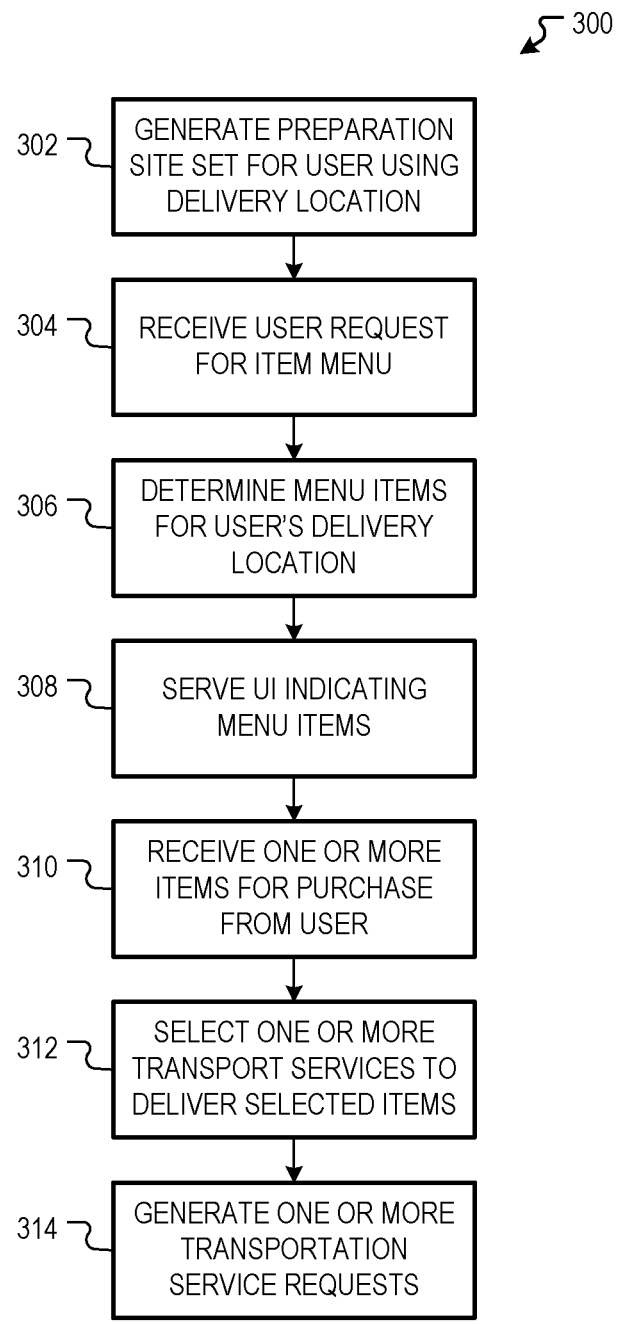
FIG. 3 is a flowchart showing an example of a process flow that may be executed by the delivery management system to arrange delivery of an item to a user.

FIG. 3 is a flowchart showing an example of a process flow 300 that may be executed by the delivery management system 102 to arrange delivery of an item to a user. In the example of FIG. 3, the delivery management system 102 provides the user 126 with a list of items that can be delivered to the delivery location 112 from a set of preparation sites, for example, including at least one virtual preparation site.

At operation 302, the delivery management system 102 generates a set of preparation sites for the user 126 using the delivery location 112. The set of preparation sites may include the virtual preparation site 116. Generating the set of preparation sites may be prompted by the user 126. For example, the user 126 may send a request indicating that the user 126 would like to browse items for delivery and/or preparation sites from which sites can be ordered. In some examples, an application executing at the user computing device 128 sends an indication to the delivery management system 102 upon launch that prompts the delivery management system 102 to select the set of preparation sites. In some examples, the request or indication includes the delivery site 112 for the user. In other examples, the delivery management system 102 stores an indication of the delivery site 112 for the user 126, for example, in association with an account of the user 126.

At operation 304, the delivery management system 102 receives, from the user 126, a request for an item menu. The item menu includes items that can be delivered to the delivery site 112 from preparation sites of the set of preparation sites selected at operation 302. At operation 306, the delivery management system 102 determines menu items for the delivery location 112. This includes, for example, selecting menu items suitable for delivery that can be obtained from delivery sites of the set of delivery sites determined at operation 304. At operation 308, the delivery management system 102 serves the UI 123 to the user computing device 128 including some or all of the menu items selected at operation 306. In some examples, the menu items include items from a single preparation site and/or from multiple preparation sites. In some examples, a single order from the user 126 may include items ultimately prepared at multiple preparation sites that can be combined into a single order at the virtual preparation site 116.

At operation 310, the delivery management system 102 receives an indication of one or more items from the set of menu items that the user 126 will purchase. At operation 312, the delivery management system 102 selects one or more transport services for delivering the selected items to the delivery site 112. This can include, for example, one or more AV and/or courier transport services from a preparation site, such as preparation site 110, to a virtual preparation site 116, one or more AV and/or courier transport services from a virtual preparation site 116 to the delivery site 112, etc. At operation 314, the delivery management system 102 generates one or more transportation service requests for implementing the transportation services selected at operation 312. The transportation service requests may be sent, for example, to one or more an aerial vehicle management systems 104, one or more courier management systems 106, etc. In some examples, the delivery management system 102 may also prepare one or more item orders for the ordered items. The one or more item orders are provided to one or more preparation sites indicating that the one or more preparation sites are to prepare the ordered items.

Figure 4:
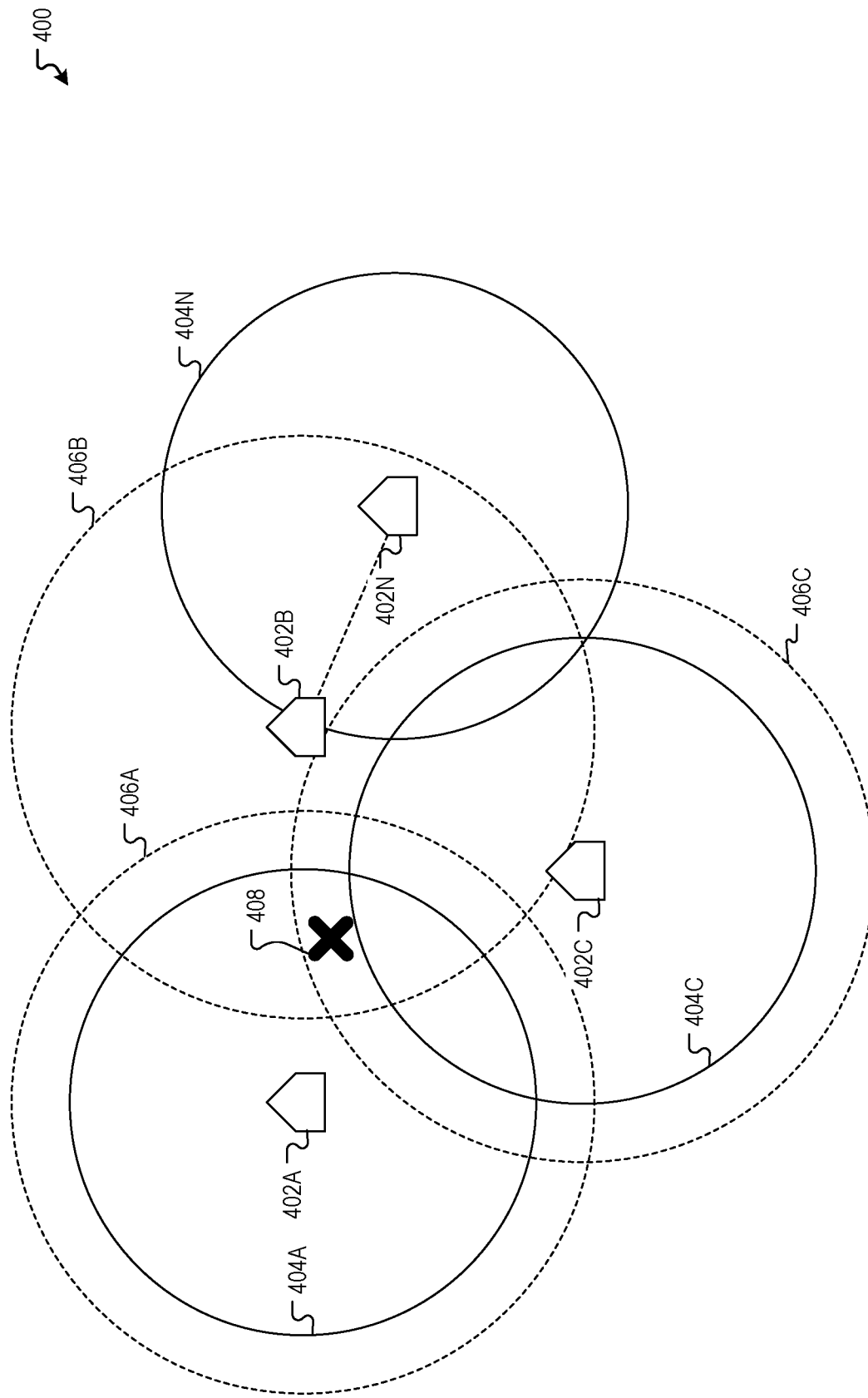
FIG. 4 is a diagram showing an example arrangement of item preparation sites that may be utilized in environments similar to the environment of FIG. 1.

FIG. 4 is a diagram 400 showing an example arrangement of preparation sites 402A, 402B, 402C, 402N that may be utilized in environments similar to the environment 100 of FIG. 1. Preparation sites 402A, 402B, 402C, 402N are shown with one or both of a road-going delivery range 404A, 404C, 404N and an AV delivery range 406A, 406B, 406C. Preparation sites 402A, 402B, 402C that have an AV delivery range may have a drone port or other facilities for launching an AV to delivery items to a user. Preparation sites 402A, 402C, 402N that have a road-going delivery range 404A, 404C, 404N may support delivery of items by road-going vehicles. In the example of FIG. 4, the preparation site 402N is a virtual preparation site associated with preparation site 402B. As shown, preparation site 402N is within the AV delivery range 406B of the virtual preparation site 402N. As described herein, the respective road-going delivery ranges 404A, 404C, 404N and/or AV delivery ranges 406A, 406B, 406C may be time-based and/or distance-based. In some examples, the different types of delivery ranges may be determined differently. For example, road-going delivery ranges 404A, 404C, 404N may be distance-based while AV delivery ranges 406A, 406B, 406C may be time-based, or visa versa.

FIG. 4 also shows an example delivery site 408. The delivery site 408 is within the road-going delivery range 404A of the preparation site 402A and within the AV delivery ranges 406A, 406B, 406C of the preparation sites 402A, 402B, 402C. Accordingly, when a user associated with the delivery site 408 requests a set of preparation sites for delivery, the delivery management system 102 may provide a set of preparation sites including preparation sites 402A, 402B, 402C. If the user selects the delivery site 408, the delivery management system 102 may generate a menu of items including items from the menu of the preparation site 402N that are suitable for AV delivery.

Figure 5:
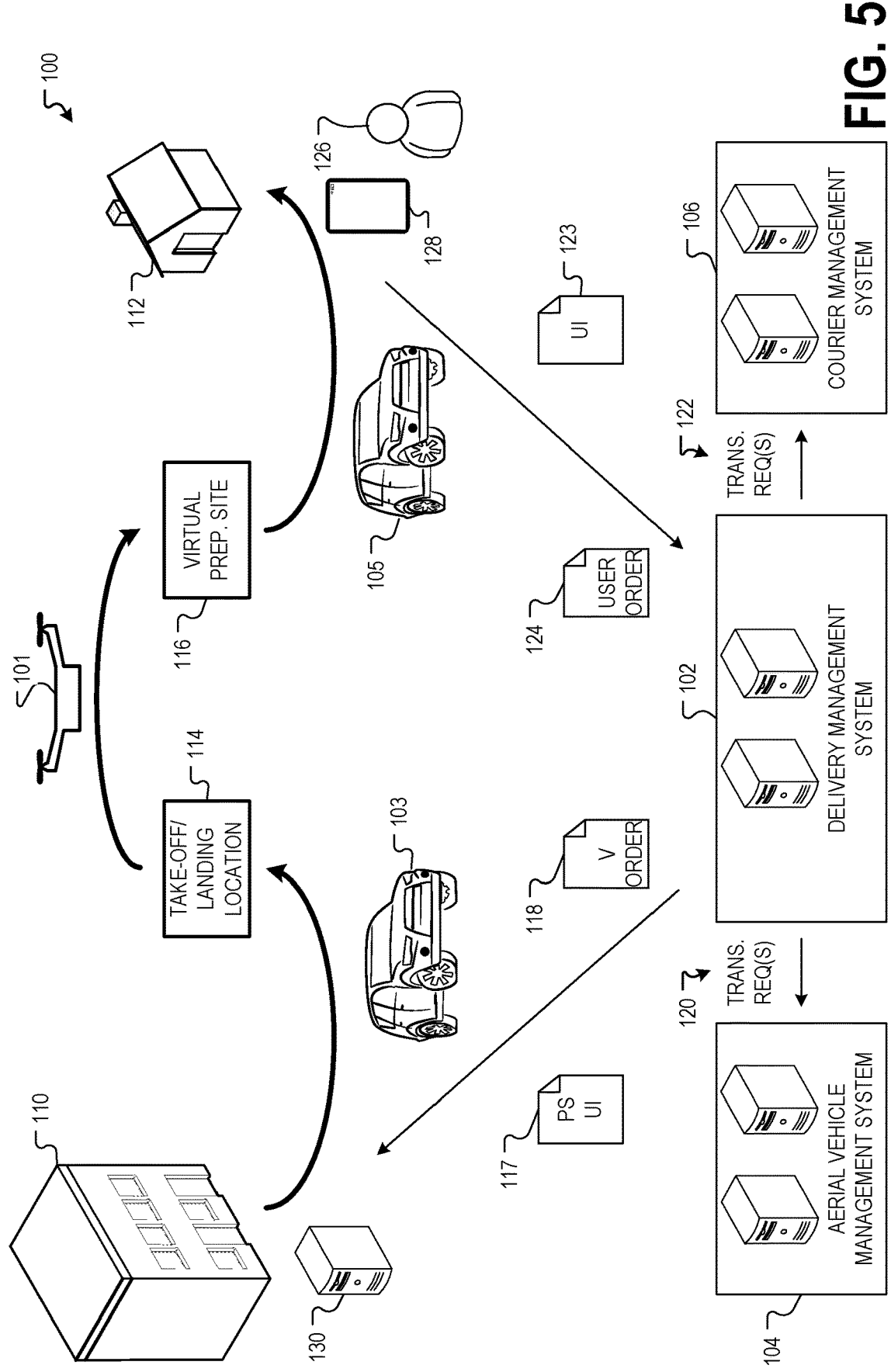
FIG. 5 is a diagram showing another example of the environment of FIG. 1 in which the preparation site provides items for road-going transport.

FIG. 5 is a diagram showing another example of the environment 100 of FIG. 1 in which the preparation site 110 provides items for road-going transport. In this example, the delivery management system 102 requests a second road-going courier vehicle 103 to arrive at the preparation site 110 to receive the item or items ordered by the user 126 and transport the item or items to a take-off/landing location 114. The AV 101 picks up the items at the take-off/landing location 114 and delivers the item or items to the virtual preparation site 116, as described herein.

The road-going currier vehicle 103 can be arranged by the courier management system 106. For example, the delivery management system 102 may request that the courier management system 106 arrange for the vehicle 103 to arrive at the preparation site 110, for example, when the item or items are ready for pick-up. In the example of FIG. 5, the total ETA for the delivery of the item or items to the delivery site 112 is the sum of the time to prepare the item or items (e.g., a preparation time), the time of the delivery by the vehicle 103 to the take-off/landing location 114, the flight by the AV 101 to the virtual preparation site 116, and the delivery by the vehicle 105 to the delivery site.

Figure 6:
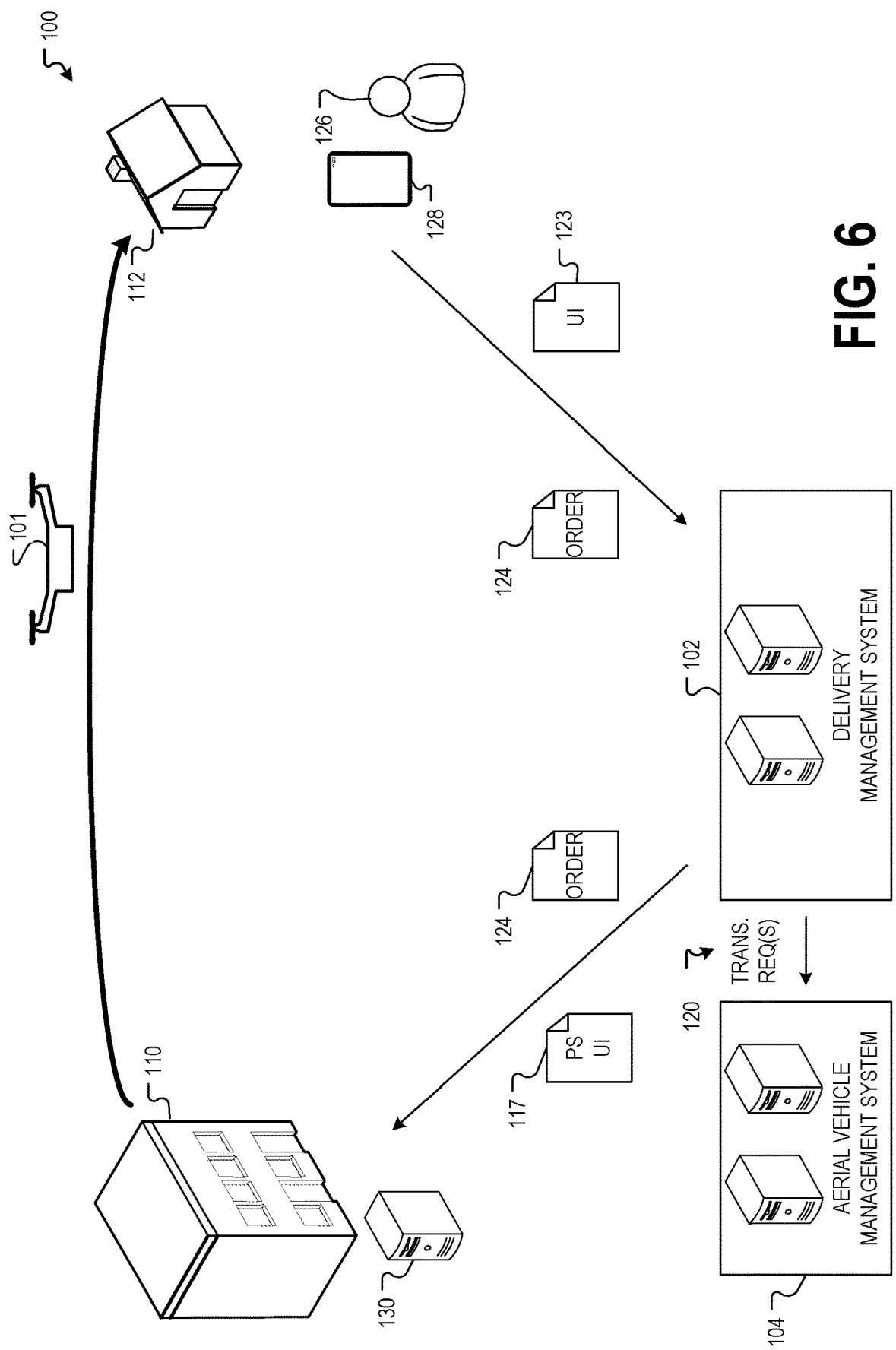
FIG. 6 is a diagram showing another example of the environment of FIG. 1 in which an AV delivers items directly to the delivery site.

FIG. 6 is a diagram showing another example of the environment 100 of FIG. 1 in which the AV 101 delivers items directly to the delivery site 112. In this example, the delivery management system 102 provides the order 124 directly to the preparation site 110. The delivery management system 102 requests that the AV management system provide the AV 101 to pick up the ordered item or items at the preparation site 110 and deliver the ordered item or items directly to the delivery site 112.

Figure 7:
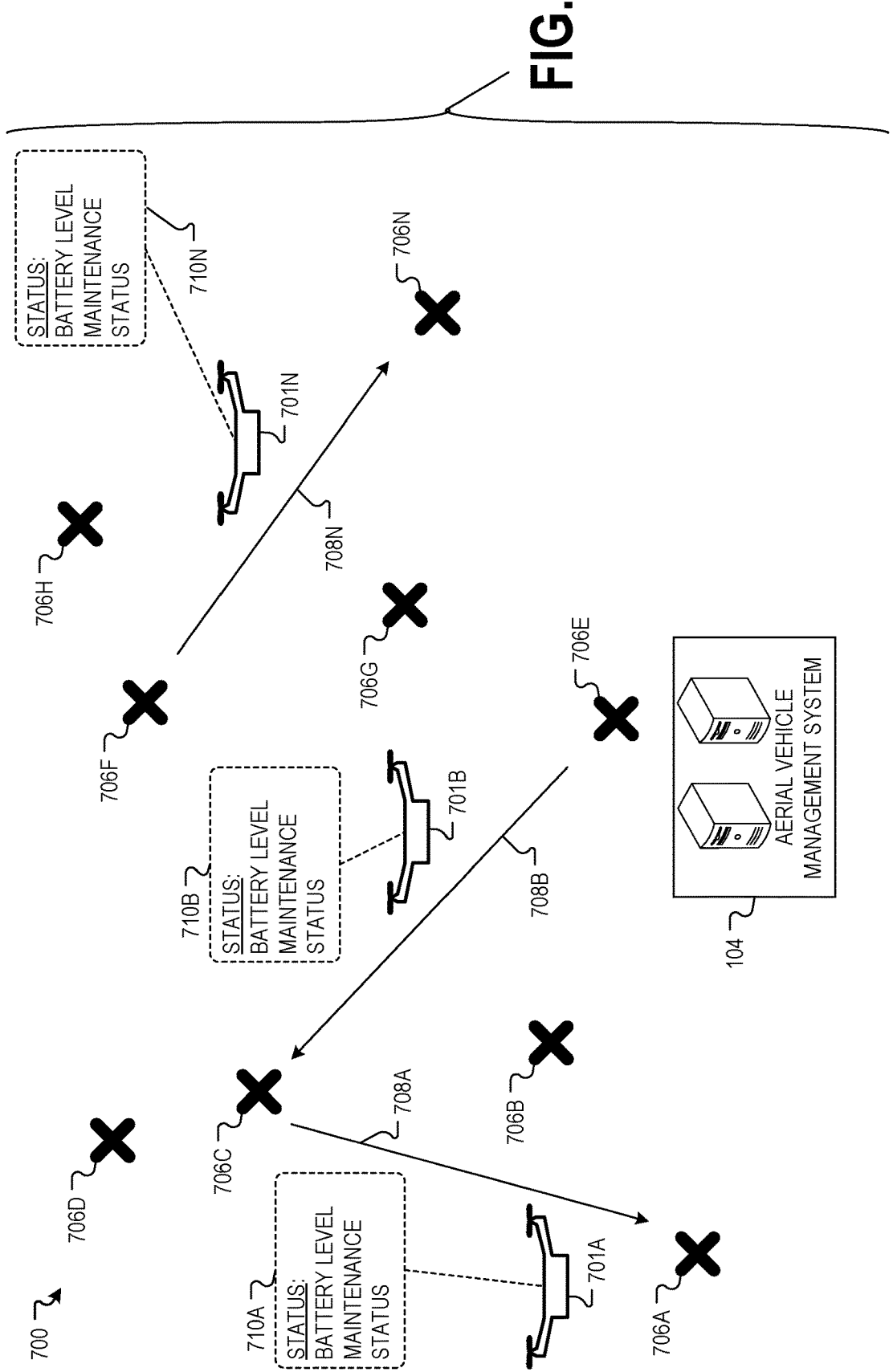
FIG. 7 is a diagram showing an example of an environment showing an AV management system.

FIG. 7 is a diagram showing an example of an environment 700 showing an example of the AV management system 104. The AV management system 104 manages a set of AVs 701A, 701B, 701N. Although three AVs 701A, 701B, 701N are shown, any suitable number of AVs may be managed. The environment 700 also includes locations 706A, 706B, 706C, 706D, 706E, 706F, 706G, 706H, 706N. The locations 706A, 706B, 706C, 706D, 706E, 706F, 706G, 706H, 706N include locations where the AV 701A, 701B, and/or 701N can take-off or land including, for example, preparation sites, such as the preparation site 110, virtual preparation sites, such as the virtual preparation site 116, delivery sites, such as the delivery site 112, and take-off/landing locations, such as the take-off/landing location 114. In some examples, one or more of the locations 706A, 706B, 706C, 706D, 706E, 706F, 706G, 706H, 706N are maintenance locations where the AVs can receive maintenance such as, for example, routine repair, repairs of damage, battery charging, etc. A maintenance location can be a dedicated location or another location, such as a virtual preparation site or preparation site, that includes equipment and/or personnel for repairing or maintaining AVs 701A, 701B, 701N. In some examples, different maintenance locations have differing capabilities. For example, some maintenance locations may offer charging only while others may offer other maintenance and/or repair.

The AV management system 104 generates routes 708A, 708B, 708N for the AVs 701A, 701B, 701N between locations 706A, 706B, 706C, 706D, 706E, 706F, 706G, 706H, 706N. The routes 708A, 708B, 708N may be determined in view of any suitable limitations including, for example, airspace limitations, weather conditions, etc. Some of the routes 708A, 708B, 708N are to execute transportation services to deliver items from one location to another, as described herein. Other routes 708A, 708B, 708N can be, for example, to stage the AV 701A, 701B, 701N for a second route to execute a transportation service.

In some examples, the AV management system 104 also generates routes based on the statuses 710A, 710B, 710N of the AVs 701A, 701B, 701N. For example, if the battery level of the AV 701A, 701B, 701N is low, the AV management system 104 routes the AV 701A, 701B, 701N to a maintenance location offering charging services. If the AV 701A, 701B, 701N is damaged or otherwise in need of maintenance, the AV management system 104 routes the AV 701A, 701B, 701N to a maintenance location offering the indicated maintenance or repair services.

Figure 8:
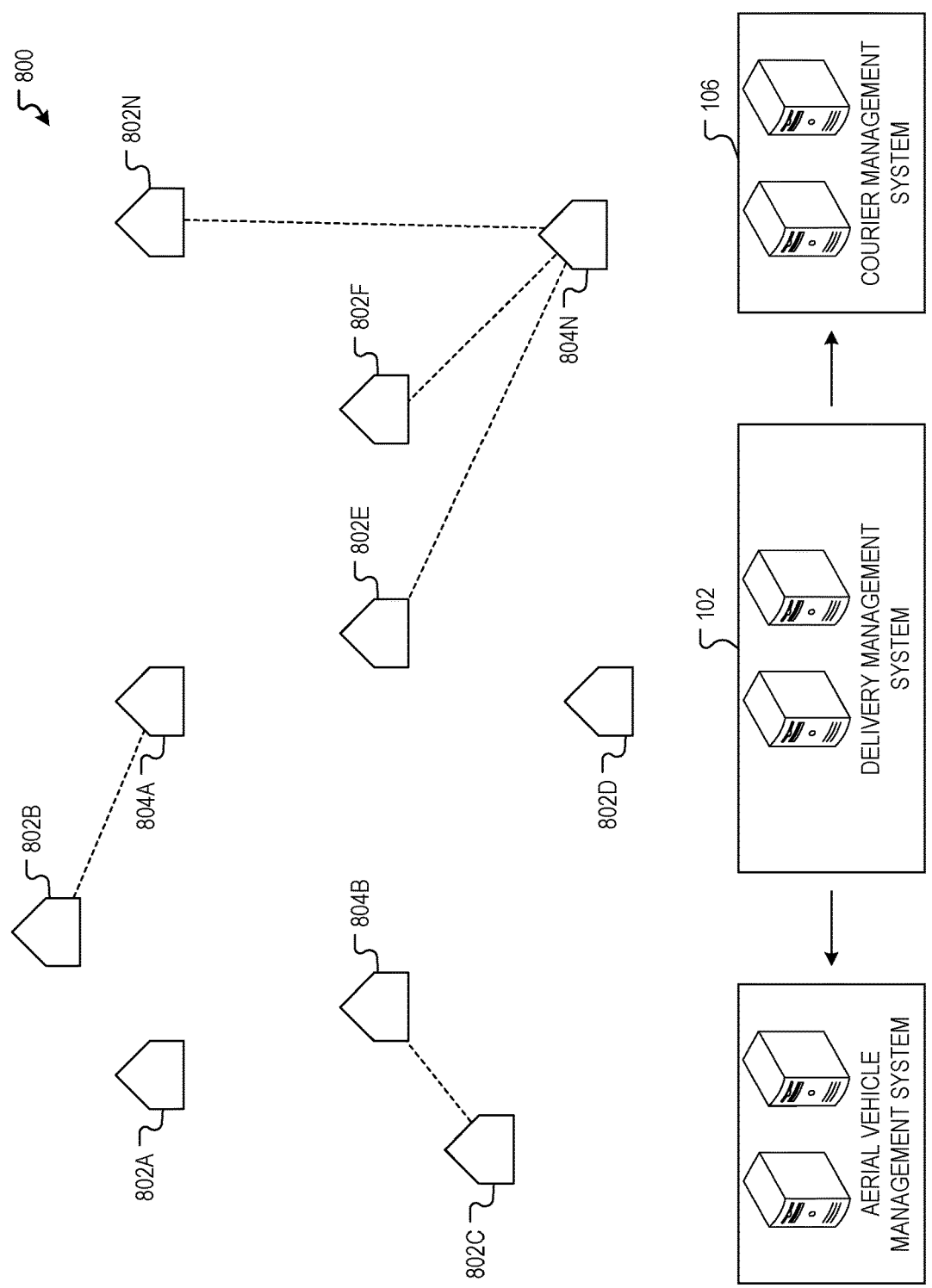
FIG. 8 is a diagram showing an example of an environment that includes preparation sites that may be used to prepare items for delivery to users.

FIG. 8 is a diagram showing an example of an environment 800 that includes preparation sites 802A, 802B, 802C, 802D, 802E, 802F, 802N, 804A, 804B, 804N that may be used for item deliveries, as described herein. In this example, the delivery management system 102 selects a set of preparation sites for a user, such as the user 126 of FIG. 1, based on the locations of the preparation sites 802A, 802B, 802C, 802D, 802E, 802F, 802N, 804A, 804B, 804N and the delivery site for the user. The delivery management system 102 may select for the user the preparation sites 802A, 802B, 802C, 802D, 802E, 802F, 802N, 804A, 804B, 804N having a delivery range that includes the user's delivery site.

In the example of FIG. 8, preparation sites 802A, 802B, 802C, 802D, 802E, 802F, and 802N are not virtual preparation sites, while preparation sites 804A, 804B, 804N are virtual preparation sites. The virtual preparation site 804A is associated with the preparation site 802B. The virtual preparation site 804B is associated with the preparation site 802C. The virtual preparation site 804N is associated with multiple preparation sites 802E, 802F, and 802N. For example, a user may be able to order items from preparation sites 802E, 802F, and 802N from the virtual preparation site 804N. The delivery management system 102 may generate a menu for the virtual preparation site 804N that includes one or more items from each of the preparation sites 802E, 802F, 802N.

The delivery management system 102 may arrange for delivery of items prepared by (e.g., from preparation sites 802A, 802B, 802C, 802D, 802E, 802F, 802N) and/or delivered through (e.g., from virtual preparation sites 804A, 804B, 804N), for example, as described herein.

Figure 9:
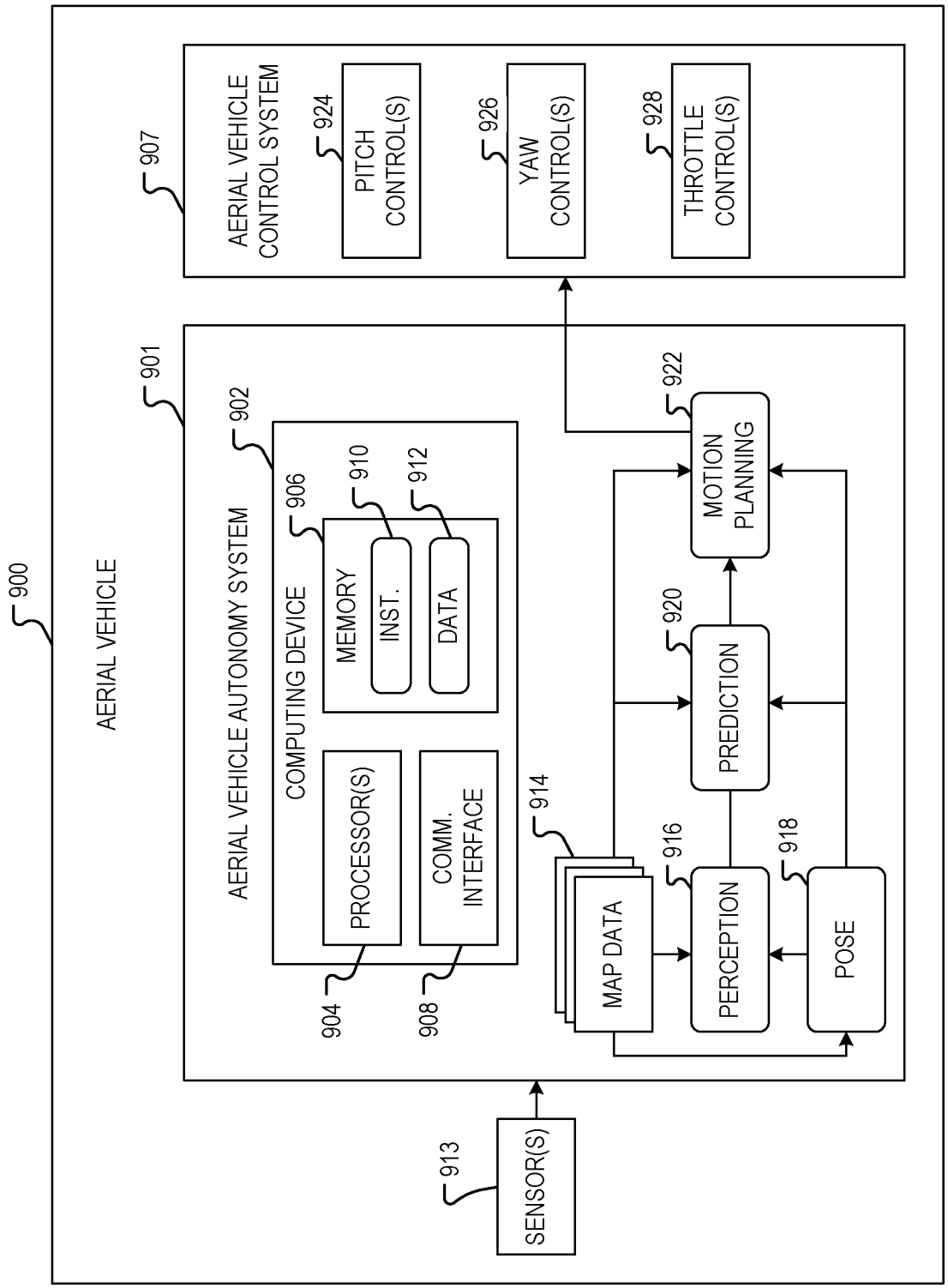
FIG. 9 is a block diagram showing a system architecture of an example AV.

FIG. 9 is a block diagram showing a system architecture of an example AV 900, according to example aspects of the present disclosure. The AV 900 can, for example, be an autonomous or semi-autonomous AV. The AV 900 includes one or more sensors 913, an aerial vehicle autonomy system 901, and an aerial vehicle control system 907. For example, the AV 900 may be utilized in the role of one or more of the AVs 101, 701A, 701B, 701N described herein.

The aerial vehicle autonomy system 901 can be engaged to control the AV 900 or to assist in controlling the AV 900. In particular, the aerial vehicle autonomy system 901 receives sensor data from the sensors 913, attempts to comprehend the environment surrounding the AV 900 by performing various processing techniques on data collected by the sensors 913 and generates an appropriate motion path through an environment. The aerial vehicle autonomy system 901 can control the aerial vehicle control system 907 to operate the AV 900 according to the motion path.

The aerial vehicle autonomy system 901 includes a perception system 916, a prediction system 920, a motion planning system 922, and a pose system 918 that cooperate to perceive the surrounding environment of the AV 900 and determine a motion plan for controlling the motion of the AV 900 accordingly.

Various portions of the aerial vehicle autonomy system 901 receive sensor data from the sensors 913. For example, the sensors 913 may include remote-detection sensors as well as motion sensors such as an inertial measurement unit (IMU), one or more encoders, etc. The sensor data can include information that describes a location of objects within the surrounding environment of the AV 900, information that describes the motion of the vehicle, etc.

The sensors 913 may also include one or more remote-detection sensors or sensor systems, such as a LIDAR, a RADAR, one or more cameras, etc. As one example, a LIDAR system of the sensors 913 generates sensor data (e.g., remote-detection sensor data) that includes a location (e.g., in three-dimensional space relative to the LIDAR system) of a number of points that correspond to objects that have reflected a ranging laser. For example, the LIDAR system can measure distances by measuring the Time of flight (TOF) that it takes a short laser pulse to travel from the sensor to an object and back, calculating the distance from the known speed of light.

As another example, for a RADAR system of the sensors 913 generates sensor data (e.g., remote-detection sensor data) that includes a location (e.g., in three-dimensional space relative to the RADAR system) of a number of points that correspond to objects that have reflected ranging radio waves. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, one or more cameras of the sensors 913 may generate sensor data (e.g., remote sensor data) including still or moving images. Various processing techniques (e.g., range imaging techniques such as, for example, structure from motion, structured light, stereo triangulation, and/or other techniques) can be performed to identify a location (e.g., in three-dimensional space relative to the one or more cameras) of a number of points that correspond to objects that are depicted in image or images captured by the one or more cameras. Other sensor systems can identify a location of points that correspond to objects as well.

As another example, the sensors 913 can include a positioning system. The positioning system can determine a current position of the AV 900. The positioning system can be any device or circuitry for analyzing the position of the AV 900. For example, the positioning system can determine a position by using one or more of inertial sensors, a satellite positioning system such as a Global Positioning System (GPS), based on IP address, by using triangulation and/or proximity to network access points or other network components (e.g., cellular towers, WiFi access points, etc.) and/or other suitable techniques. The position of the AV 900 can be used by various systems of the aerial vehicle autonomy system 901.

Thus, the sensors 913 can be used to collect sensor data that includes information that describes a location (e.g., in three-dimensional space relative to the AV 900) of points that correspond to objects within the surrounding environment of the AV 900. In some implementations, the sensors 913 can be located at various different locations on the AV 900.

The pose system 918 receives some or all of the sensor data from the sensors 913 and generates vehicle poses for the AV 900. A vehicle pose describes the position (including altitude) and attitude of the vehicle. The position of the AV 900 is a point in a three dimensional space. In some examples, the position is described by values for a set of Cartesian coordinates, although any other suitable coordinate system may be used. The attitude of the AV 900 generally describes the way in which the AV 900 is oriented at its position. In some examples, attitude is described by a yaw about the vertical axis, a pitch about a first horizontal axis and a roll about a second horizontal axis. In some examples, the pose system 918 generates vehicle poses periodically (e.g., every second, every half second, etc.) The pose system 918 appends time stamps to vehicle poses, where the time stamp for a pose indicates the point in time that is described by the pose. The pose system 918 generates vehicle poses by comparing sensor data (e.g., remote sensor data) to map data 914 describing the surrounding environment of the AV 900.

In some examples, the pose system 918 includes localizers and a pose filter. Localizers generate pose estimates by comparing remote sensor data (e.g., LIDAR, RADAR, etc.) to map data. The pose filter receives pose estimates from the one or more localizers as well as other sensor data such as, for example, motion sensor data from an IMU, encoder, odometer, etc. In some examples, the pose filter executes a Kalman filter or other machine learning algorithm to combine pose estimates from the one or more localizers with motion sensor data to generate vehicle poses. In some examples, localizers generate pose estimates at a frequency less than the frequency at which the pose system 918 generates vehicle poses. Accordingly, the pose filter generates some vehicle poses by extrapolating from a previous pose estimates.

The perception system 916 detects objects in the surrounding environment of the AV 900 based on the sensor data, the map data 914 and/or vehicle poses provided by the pose system 918. The map data 914, for example, may provide detailed information about the surrounding environment of the AV 900. The map data 914 can provide information regarding the identity and location of geographic places and entities, with specific details related to landing and take-off considerations (e.g., the location of pylons and other obstacles) The map data 914 may be used by the aerial vehicle autonomy system 901 in comprehending and perceiving its surrounding environment and its relationship thereto. The perception system 916 uses vehicle poses provided by the pose system 918 to place AV 900 environment.

In some examples, the perception system 916 determines state data for objects in the surrounding environment of the AV 900. State data may describe a current state of an object (also referred to as features of the object). The state data for each object describes, for example, an estimate of the object's: current location (also referred to as position); current speed (also referred to as velocity); current acceleration; current heading; current orientation; size/shape/footprint (e.g., as represented by a bounding shape such as a bounding polygon or polyhedron); type/class; yaw rate; distance from the AV 900; minimum path to interaction with the AV 900; minimum time duration to interaction with the AV 900; and/or other state information.

In some implementations, the perception system 916 can determine state data for each object over a number of iterations. In particular, the perception system 916 can update the state data for each object at each iteration. Thus, the perception system 916 can detect and track objects, such as vehicles, that are proximate to the AV 900 over time.

The prediction system 920 is configured to predict future positions for an object or objects in the environment surrounding the AV 900 (e.g., an object or objects detected by the perception system 916). The prediction system 920 can generate prediction data associated with objects detected by the perception system 916. In some examples, the prediction system 920 generates prediction data describing each of the respective objects detected by the perception system 916.

Prediction data for an object can be indicative of one or more predicted future locations of the object. For example, the prediction system 920 may predict where the object will be located within the next 5 seconds, 20 seconds, 200 seconds, etc. Prediction data for an object may indicate a predicted trajectory (e.g., predicted path) for the object within the surrounding environment of the AV 900. For example, the predicted trajectory (e.g., path) can indicate a path along which the respective object is predicted to travel over time (and/or the speed at which the object is predicted to travel along the predicted path). The prediction system 920 generates prediction data for an object, for example, based on state data generated by the perception system 916. In some examples, the prediction system 920 also considers one or more vehicle poses generated by the pose system 918 and/or the map data 914.

In some examples, the prediction system 920 uses state data indicative of an object type or classification to predict a trajectory for the object. As an example, the prediction system 920 can use state data provided by the perception system 916 to determine that particular object (e.g., an object classified as a vehicle). The prediction system 920 can provide the predicted trajectories associated with the object(s) to the motion planning system 922.

In some implementations, the prediction system 920 is a goal-oriented prediction system that generates potential goals, selects the most likely potential goals, and develops trajectories by which the object can achieve the selected goals. For example, the prediction system 920 can include a scenario generation system that generates and/or scores the goals for an object and a scenario development system that determines the trajectories by which the object can achieve the goals. In some implementations, the prediction system 920 can include a machine-learned goal-scoring model, a machine-learned trajectory development model, and/or other machine-learned models.

The motion planning system 922 determines a motion plan for the AV 900 based at least in part on the predicted trajectories associated with the objects within the surrounding environment of the AV 900, the state data for the objects provided by the perception system 916, vehicle poses provided by the pose system 918, and/or the map data 914. Stated differently, given information about the current locations of objects and/or predicted trajectories of objects within the surrounding environment of the AV 900, the motion planning system 922 can determine a motion plan for the AV 900 that best navigates the AV 900 relative to the objects at such locations and their predicted trajectories on acceptable roadways.

In some implementations, the motion planning system 922 can evaluate cost functions and/or one or more reward functions for each of one or more candidate motion plans for the AV 900. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations/trajectories of objects, the motion planning system 922 can determine a total cost (e.g., a sum of the cost(s) and/or reward(s) provided by the cost function(s) and/or reward function(s)) of adhering to a particular candidate pathway. The motion planning system 922 can select or determine a motion plan for the AV 900 based at least in part on the cost function(s) and the reward function(s). For example, the motion plan that minimizes the total cost can be selected or otherwise determined. The motion plan can be, for example, a path along which the AV 900 will travel in one or more forthcoming time periods. In some implementations, the motion planning system 922 can be configured to iteratively update the motion plan for the AV 900 as new sensor data is obtained from the sensors 913. For example, as new sensor data is obtained from the sensors 913, the sensor data can be analyzed by the perception system 916, the prediction system 920, and the motion planning system 922 to determine the motion plan.

Each of the perception system 916, the prediction system 920, the motion planning system 922, and the pose system 918, can be included in or otherwise a part of the AV 900 configured to determine a motion plan based on data obtained from the sensors 913. For example, data obtained by the sensors 913 can be analyzed by each of the perception system 916, the prediction system 920, and the motion planning system 922 in a consecutive fashion in order to develop the motion plan. While FIG. 9 depicts elements suitable for use in a vehicle autonomy system according to example aspects of the present disclosure, one of ordinary skill in the art will recognize that other vehicle autonomy systems can be configured to determine a motion plan for an autonomous vehicle based on sensor data.

The motion planning system 922 can provide the motion plan to aerial vehicle control system 907 to execute the motion plan. For example, the aerial vehicle control system 907 can include pitch control module 924, yaw control module 926, and a throttle control system 928, each of which can include various vehicle controls (e.g., actuators or other devices or motors that control power) to control the motion of the AV 900. The various aerial vehicle control system 907 can include one or more controllers, control devices, motors, and/or processors.

A throttle control system 928 is configured to receive all or part of the motion plan and generate a throttle command. The throttle command is provided to an engine and/or engine controller, or other propulsion system component to control the engine or other propulsion system of the AV 900.

The aerial vehicle autonomy system 901 includes one or more computing devices, such as the computing device 902 which may implement all or parts of the perception system 916, the prediction system 920, the motion planning system 922 and/or the pose system 918. The example computing device 902 can include one or more processors 904 and one or more memory devices (collectively referred to as memory 906). The processors 904 can be any suitable processing device (e.g., a processor core, a microprocessor, an Application Specific Integrated Circuit (ASIC), a Field Programmable Gate Array (FPGA), a microcontroller, etc.) and can be one processor or a plurality of processors that are operatively connected. The memory 906 can include one or more non-transitory computer-readable storage mediums, such as Random Access Memory (RAM), Read Only Memory (ROM), Electrically Erasable Programmable Read Only Memory (EEPROM), Erasable Programmable Read Only Memory (EPROM), flash memory devices, magnetic disks, etc., and combinations thereof. The memory 906 can store data 912 and instructions 910 which can be executed by the processors 904 to cause the aerial vehicle autonomy system 901 to perform operations. The computing device 902 can also include a communications interface 908, which can allow the computing device 902 to communicate with other components of the AV 900 or external computing systems, such as via one or more wired or wireless networks. Additional descriptions of hardware and software configurations for computing devices, such as the computing device 902 are provided herein.

Figure 10:
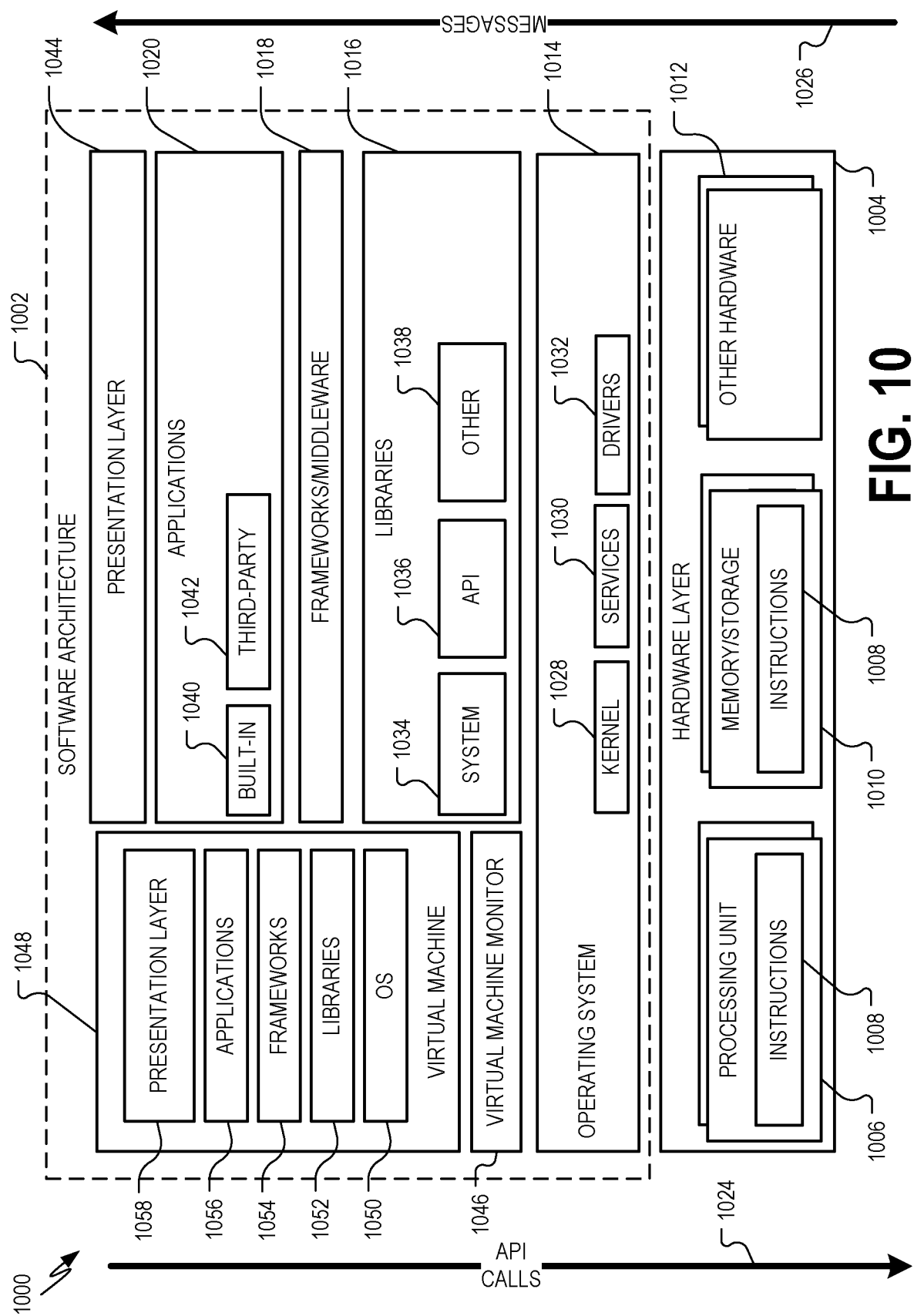
FIG. 10 is a block diagram showing one example of a software architecture for a computing device.

FIG. 10 is a block diagram 1000 showing one example of a software architecture 1002 for a computing device. The software architecture 1002 may be used in conjunction with various hardware architectures, for example, as described herein. FIG. 10 is merely a non-limiting example of a software architecture 1002 and many other architectures may be implemented to facilitate the functionality described herein. A representative hardware layer 1004 is illustrated and can represent, for example, any of the above-referenced computing devices. In some examples, the hardware layer 1004 may be implemented according to an architecture 1100 of FIG. 11 and/or the software architecture 1002 of FIG. 10.

The representative hardware layer 1004 comprises one or more processing units 1006 having associated executable instructions 1008. The executable instructions 1008 represent the executable instructions of the software architecture 1002, including implementation of the methods, modules, components, and so forth of FIGS. 1-9. The hardware layer 1004 also includes memory and/or storage modules 1010, which also have the executable instructions 1008. The hardware layer 1004 may also comprise other hardware 1012, which represents any other hardware of the hardware layer 1004, such as the other hardware illustrated as part of the architecture 1100.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020, and a presentation layer 1044. Operationally, the applications 1020 and/or other components within the layers may invoke API calls 1024 through the software stack and receive a response, returned values, and so forth illustrated as messages 1026 in response to the API calls 1024. The layers illustrated are representative in nature and not all software architectures have all layers. For example, some mobile or special-purpose operating systems may not provide a frameworks/middleware 1018 layer, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of a hardware or software interrupt and, in response, cause the software architecture 1002 to pause its current processing and execute an ISR when an interrupt is received. The ISR may generate an alert.

The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), WiFi® drivers, NFC drivers, audio drivers, power management drivers, and so forth depending on the hardware configuration.

The libraries 1016 may provide a common infrastructure that may be used by the applications 1020 and/or other components and/or layers. The libraries 1016 typically provide functionality that allows other software modules to perform tasks in an easier fashion than by interfacing directly with the underlying operating system 1014 functionality (e.g., kernel 1028, services 1030, and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks/middleware 1018 (also sometimes referred to as middleware) may provide a higher-level common infrastructure that may be used by the applications 1020 and/or other software components/modules. For example, the frameworks/middleware 1018 may provide various graphical user interface (GUI) functions, high-level resource management, high-level location services, and so forth. The frameworks/middleware 1018 may provide a broad spectrum of other APIs that may be used by the applications 1020 and/or other software components/modules, some of which may be specific to a particular operating system or platform.

The applications 1020 include built-in applications 1040 and/or third-party applications 1042. Examples of representative built-in applications 1040 may include, but are not limited to, a contacts application, a browser application, a book reader application, a location application, a media application, a messaging application, and/or a game application. The third-party applications 1042 may include any of the built-in applications 1040 as well as a broad assortment of other applications. In a specific example, the third-party application 1042 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 1042 may invoke the API calls 1024 provided by the mobile operating system such as the operating system 1014 to facilitate functionality described herein.

The applications 1020 may use built-in operating system functions (e.g., kernel 1028, services 1030, and/or drivers 1032), libraries (e.g., system libraries 1034, API libraries 1036, and other libraries 1038), or frameworks/middleware 1018 to create user interfaces to interact with users of the system. Alternatively, or additionally, in some systems, interactions with a user may occur through a presentation layer, such as the presentation layer 1044. In these systems, the application/module "logic" can be separated from the aspects of the application/module that interact with a user.

Some software architectures use virtual machines. For example, systems described herein may be executed using one or more virtual machines executed at one or more server computing machines. In the example of FIG. 10, this is illustrated by a virtual machine 1048. A virtual machine creates a software environment where applications/modules can execute as if they were executing on a hardware computing device. The virtual machine 1048 is hosted by a host operating system (e.g., the operating system 1014) and typically, although not always, has a virtual machine monitor 1046, which manages the operation of the virtual machine 1048 as well as the interface with the host operating system (e.g., the operating system 1014). A software architecture executes within the virtual machine 1048, such as an operating system 1050, libraries 1052, frameworks/middleware 1054, applications 1056, and/or a presentation layer 1058. These layers of software architecture executing within the virtual machine 1048 can be the same as corresponding layers previously described or may be different.

Figure 11:
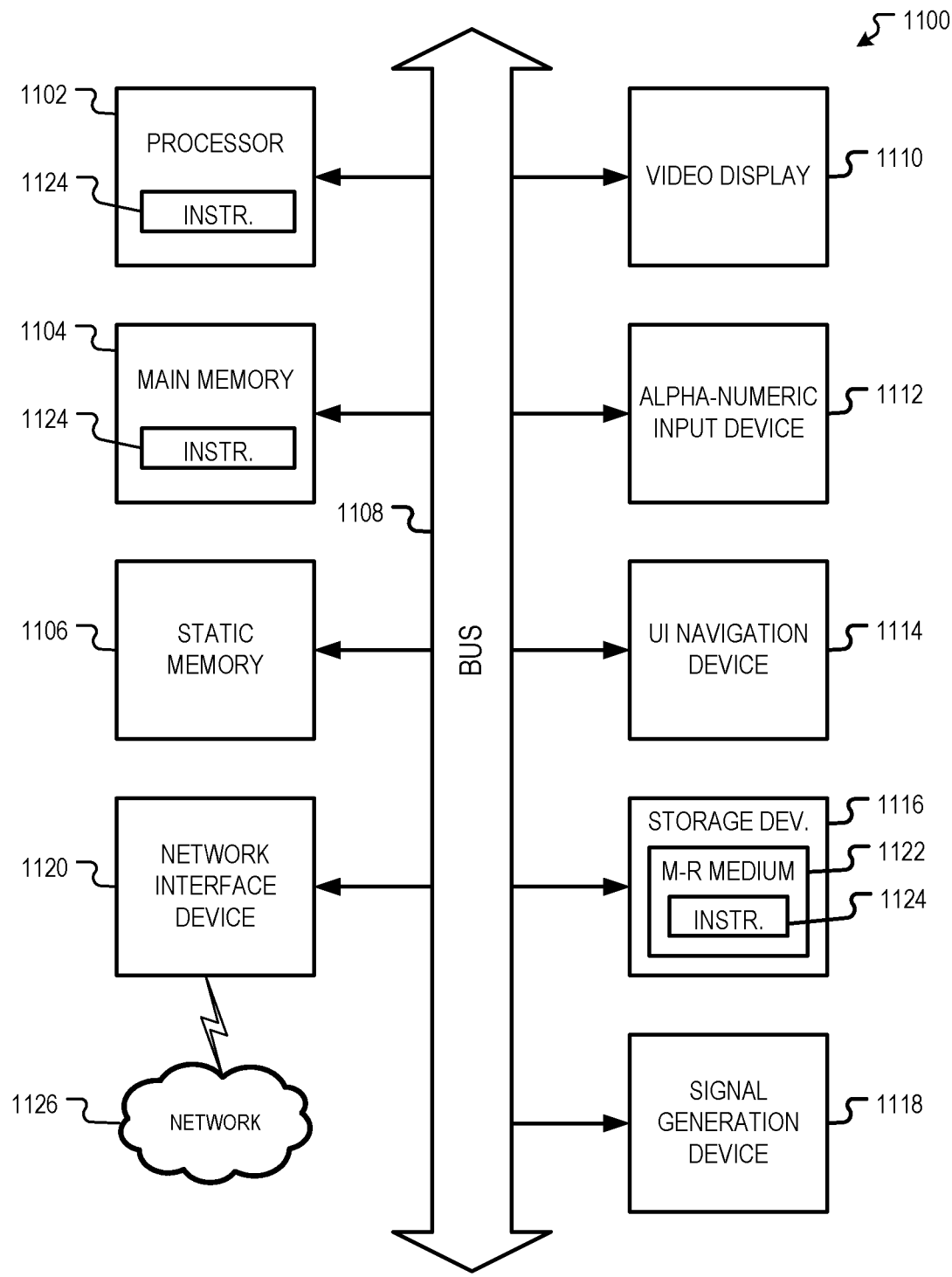
FIG. 11 is a block diagram illustrating a computing device hardware architecture, within which a set or sequence of instructions can be executed to cause a machine to perform examples of any one of the methodologies discussed herein.

FIG. 11 is a block diagram illustrating a computing device hardware architecture 1100, within which a set or sequence of instructions can be executed to cause a machine to perform examples of any one of the methodologies discussed herein. The hardware architecture 1100 describes a computing device for executing the vehicle autonomy system, described herein.

The architecture 1100 may operate as a standalone device or may be connected (e.g., networked) to other machines. In a networked deployment, the architecture 1100 may operate in the capacity of either a server or a client machine in server-client network environments, or it may act as a peer machine in peer-to-peer (or distributed) network environments. The architecture 1100 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 1100 includes a processor unit 1102 comprising at least one processor (e.g., a central processing unit (CPU), a graphics processing unit (GPU), or both, processor cores, compute nodes). The architecture 1100 may further comprise a main memory 1104 and a static memory 1106, which communicate with each other via a link 1108 (e.g., bus). The architecture 1100 can further include a video display unit 1110, an input device 1112 (e.g., a keyboard), and a UI navigation device 1114 (e.g., a mouse). In some examples, the video display unit 1110, input device 1112, and UI navigation device 1114 are incorporated into a touchscreen display. The architecture 1100 may additionally include a storage device 1116 (e.g., a drive unit), a signal generation device 1118 (e.g., a speaker), a network interface device 1120, and one or more sensors (not shown), such as a Global Positioning System (GPS) sensor, compass, accelerometer, or other sensor.

In some examples, the processor unit 1102 or another suitable hardware component may support a hardware interrupt. In response to a hardware interrupt, the processor unit 1102 may pause its processing and execute an ISR, for example, as described herein.

The storage device 1116 includes a machine-readable medium 1122 on which is stored one or more sets of data structures and instructions 1124 (e.g., software) embodying or used by any one or more of the methodologies or functions described herein. The instructions 1124 can also reside, completely or at least partially, within the main memory 1104, within the static memory 1106, and/or within the processor unit 1102 during execution thereof by the architecture 1100, with the main memory 1104, the static memory 1106, and the processor unit 1102 also constituting machine-readable media.

Executable Instructions and Machine-Storage Medium

The various memories (i.e., 1104, 1106, and/or memory of the processor unit(s) 1102) and/or storage device 1116 may store one or more sets of instructions and data structures (e.g., instructions) 1124 embodying or used by any one or more of the methodologies or functions described herein. These instructions, when executed by processor unit(s) 1102 cause various operations to implement the disclosed examples.

As used herein, the terms "machine-storage medium," "device-storage medium," "computer-storage medium" (referred to collectively as "machine-storage medium 1122") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1122 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1122 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1124 can further be transmitted or received over a communications network 1126 using a transmission medium via the network interface device 1120 using any one of a number of well-known transfer protocols (e.g., HTTP). Examples of communication networks include a LAN, a WAN, the Internet, mobile telephone networks, plain old telephone service (POTS) networks, and wireless data networks (e.g., Wi-Fi, 3G, 4G LTE/LTE-A, 5G or WiMAX networks). The term "transmission medium" shall be taken to include any intangible medium that is capable of storing, encoding, or carrying instructions for execution by the machine, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

The invention claimed is:

1. A method comprising:
   accessing a plurality of items associated with an individual preparation site;
   receiving a selection of a virtual preparation site from a user computing device;
   identifying, by a server, a set of items of the plurality of items that is available for delivery, at least partially via aerial delivery, to the virtual preparation site selected by the user computing device and associated with the user from the individual preparation site, the set of items being available for delivery from the virtual preparation site to a delivery site associated with the user outside of a delivery range of the individual preparation site;
   generating, by the server for provision to the user computing device, menu data comprising the set of items, the menu data indicating that a first item in the set of items is associated with the aerial delivery;
   receiving, from a user computing device, a request for delivery of the first item; and
   sending, by the server, an instruction for an aerial vehicle to autonomously deliver the first item to the delivery site via the virtual preparation site.

2. The method of claim 1, further comprising:
   selecting a set of preparation sites for the user using preparation site location data and the delivery site associated with the user, wherein the set of preparation sites comprises the virtual preparation site that is associated with the individual preparation site.

3. The method of claim 1, further comprising requesting a courier vehicle to deliver the first item from the individual preparation site to a take-off/landing location for the aerial vehicle.

4. The method of claim 1, further comprising determining that the delivery site is within a delivery range of the aerial vehicle.

5. The method of claim 1, further comprising:
   determining an estimated time of arrival (ETA) for the first item using a preparation time for the individual preparation site to prepare the first item, and a delivery time for the aerial vehicle to deliver the first item to the delivery site; and
   serving an indication of the ETA to the user computing device.

6. The method of claim 1, wherein the request comprises a first order associated with a first user account of the user, the first user account associated with the delivery site.

7. A system comprising:
   at least one processor programmed to perform operations comprising:
   accessing a plurality of items associated with an individual preparation site;
   receiving a selection of a virtual preparation site from a user computing device;
   identifying, by a server, a set of items of the plurality of items that is available for delivery, at least partially via aerial delivery, to the virtual preparation site selected by the user computing device and associated with the user from the individual preparation site, the set of items being available for delivery from the virtual preparation site to a delivery site associated with the user outside of a delivery range of the individual preparation site;
   generating, by the server for provision to the user computing device, menu data comprising the set of items, the menu data indicating that a first item in the set of items is associated with the aerial delivery;
   receiving, from a user computing device, a request for delivery of the first item; and
   sending, by the server, an instruction for an aerial vehicle to autonomously deliver the first item to the delivery site via the virtual preparation site.

8. The system of claim 7, the operations further comprising requesting a courier vehicle to deliver the first item to the delivery site from the aerial vehicle.

9. The system of claim 7, the operations further comprising requesting a courier vehicle to deliver the first item from the individual preparation site to a take-off/landing location for the aerial vehicle.

10. The system of claim 7, the operations further comprising determining that the delivery site is within a delivery range of the aerial vehicle.

11. The system of claim 7, the operations further comprising:
    determining an estimated time of arrival (ETA) for the first item using a preparation time for the individual preparation site to prepare the first item, and a delivery time for the aerial vehicle to deliver the first item to the delivery site.

12. The system of claim 11, the operations comprising:
    serving an indication of the ETA to the user computing device.

13. The system of claim 7, wherein the request comprises a first order associated with a first user account of the user, the first user account associated with the delivery site.

14. A machine-readable medium comprising instructions thereon that, when executed by at least one processor, cause the at least one processor to perform operations comprising:
    accessing a plurality of items associated with an individual preparation site;
    receiving a selection of a virtual preparation site from a user computing device;
    identifying, by a server, a set of items of the plurality of items that is available for delivery, at least partially via aerial delivery, to the virtual preparation site selected by the user computing device and associated with the user from the individual preparation site, the set of items being available for delivery from the virtual preparation site to a delivery site associated with the user outside of a delivery range of the individual preparation site;

generating, by the server for provision to the user computing device, menu data comprising the set of items, the menu data indicating that a first item in the set of items is associated with the aerial delivery;

receiving, from a user computing device, a request for delivery of the first item; and sending, by the server, an instruction for an aerial vehicle to autonomously deliver the first item to the delivery site via the virtual preparation site.

15. The machine-readable medium of claim 14, the operations further comprising requesting a courier vehicle to deliver the first item to the delivery site from the aerial vehicle.

16. The machine-readable medium of claim 14, the operations further comprising requesting a courier vehicle to deliver the first item from the individual preparation site to a take-off/landing location for the aerial vehicle.

17. The machine-readable medium of claim 14, the operations further comprising determining that the delivery site is within a delivery range of the aerial vehicle.

18. The machine-readable medium of claim 14, the operations further comprising:

determining an estimated time of arrival (ETA) for the first item using a preparation time for the individual preparation site to prepare the first item, and a delivery time for the aerial vehicle to deliver the first item to the delivery site.

19. The machine-readable medium of claim 18, the operations comprising:

serving an indication of the ETA to the user computing device.

20. The machine-readable medium of claim 14, wherein the request comprises a first order associated with a first user account of the user, the first user account associated with the delivery site.

\* \* \* \* \*

UNITED STATES PATENT AND TRADEMARK OFFICE
CERTIFICATE OF CORRECTION

PATENT NO. : 12,314,891 B2
APPLICATION NO. : 18/452207
DATED : May 27, 2025
INVENTOR(S) : Warmoth et al.

Page 1 of 1

It is certified that error appears in the above-identified patent and that said Letters Patent is hereby corrected as shown below:

In the Claims

In Column 20, Line 51, in Claim 12, after "operations", insert --further--

Signed and Sealed this
Twenty-ninth Day of July, 2025

Coke Morgan Stewart
*Acting Director of the United States Patent and Trademark Office*